United States Patent
Sato et al.

(10) Patent No.: US 7,981,554 B2
(45) Date of Patent: Jul. 19, 2011

(54) FUEL CELL SYSTEM

(75) Inventors: Masahiko Sato, Utsunomiya (JP);
Yosuke Fujii, Tochigi-ken (JP);
Yasunori Kotani, Utsunomiya (JP);
Hideaki Kikuchi, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 1035 days.

(21) Appl. No.: 11/250,039

(22) Filed: Oct. 12, 2005

(65) Prior Publication Data
US 2006/0088756 A1    Apr. 27, 2006

(30) Foreign Application Priority Data

Oct. 21, 2004  (JP) .................................. 2004-306714
Oct. 21, 2004  (JP) .................................. 2004-306810

(51) Int. Cl.
*H01M 8/06* (2006.01)
(52) U.S. Cl. ........................................ 429/408; 429/479
(58) Field of Classification Search ................ 429/12
See application file for complete search history.

(56) References Cited

U.S. PATENT DOCUMENTS

| | | | |
|---|---|---|---|
| 6,316,139 B1 * | 11/2001 | Uchida et al. | 429/36 |
| 6,329,094 B1 * | 12/2001 | Yasuo et al. | 429/444 |
| 6,743,540 B2 * | 6/2004 | Walsh et al. | 429/25 |
| 6,766,817 B2 | 7/2004 | da Silva | |
| 2002/0094469 A1 | 7/2002 | Yoshizumi et al. | |
| 2004/0013919 A1 | 1/2004 | Ueda et al. | |
| 2004/0197614 A1 * | 10/2004 | Simpson et al. | 429/17 |
| 2008/0070090 A1 | 3/2008 | Yoshizumi et al. | |
| 2010/0151360 A1 | 6/2010 | Yoshizumi et al. | |

FOREIGN PATENT DOCUMENTS

| | | |
|---|---|---|
| JP | 07-192743 | 7/1995 |
| JP | 08-115734 | 5/1996 |
| JP | 08-185883 | 7/1996 |
| JP | 11-204126 | 7/1999 |
| JP | 2001-266925 | 9/2001 |
| JP | 2002-289237 | 10/2002 |
| JP | 2003-092130 | 3/2003 |
| JP | 2003-132915 | 5/2003 |
| JP | 2004-55287 | 2/2004 |
| JP | 2004-127666 | 4/2004 |

* cited by examiner

*Primary Examiner* — Ula C Ruddock
*Assistant Examiner* — Jacob Marks
(74) *Attorney, Agent, or Firm* — Fish & Richardson P.C.

(57) ABSTRACT

A fuel cell system includes a fuel cell stack, a gas liquid separator, a first drain channel, and a second drain channel. The gas liquid separator is connected to a fuel gas discharge passage of the fuel cell stack through a fuel gas discharge channel. The first drain channel is connected to the fuel gas discharge passage separately from the fuel gas discharge channel, and connected to the gas liquid separator through a valve unit. The second drain channel chiefly discharges liquid droplets from the gas liquid separator.

4 Claims, 8 Drawing Sheets

FUEL CELL SYSTEM

BACKGROUND OF THE INVENTION

1. Field of the Invention

The present invention relates to a fuel cell system including an internal manifold type fuel cell formed by stacking an electrolyte electrode assembly and separators. The electrolyte electrode assembly includes a pair of electrodes and an electrolyte interposed between the electrodes. At least reactant gas supply passages and reactant gas discharge passages extend through the fuel cell in the stacking direction.

2. Description of the Related Art

For example, a solid polymer fuel cell employs a membrane electrode assembly (MEA) which includes an anode, a cathode, and an electrolyte membrane (electrolyte) interposed between the anode and the cathode. The electrolyte membrane is a polymer ion exchange membrane. The membrane electrode assembly and separators sandwiching the membrane electrode assembly make up a unit of a power generation cell for generating electricity. In use, a predetermined number of power generation cells are stacked together to form a fuel cell stack.

In the fuel cell, a fuel gas such as a gas chiefly containing hydrogen (hereinafter also referred to as the "hydrogen-containing gas") is supplied to the anode. A gas chiefly containing oxygen or air (hereinafter also referred to as the "oxygen-containing gas") is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

In this case, some of the fuel gas supplied to the anode is not consumed in the power generation, and discharged from the fuel cell. Since the unconsumed fuel gas is discharged wastefully from the fuel cell, good fuel economy may not be achieved. In order to improve the fuel economy, in a proposed structure, the unconsumed fuel gas discharged from the fuel cell is mixed with the fresh fuel gas, and supplied again to the anode.

The operating temperature of the solid polymer fuel cell is relatively low (100° C. or less). Therefore, after the water flows into the fuel cell stack, the water which has not been absorbed to the electrolyte membrane or the water produced in the power generation is cooled in the reactant gas flow field (the oxygen-containing gas flow field and/or the fuel gas flow field) of the fuel cell stack or the reactant gas flow passage (the oxygen-containing gas passage and/or the fuel gas passage) as a manifold extending through the fuel cell stack in the sacking direction, and connected to the reactant gas flow field. The water is likely to be retained in the liquid state.

However, in the presence of water in the reactant gas flow field or the reactant gas passage of the fuel cell stack, it is difficult to sufficiently supply the oxygen-containing gas or the fuel gas to each of the unit cells. Therefore, the fuel gas and the oxygen-containing gas as reactant gases are not diffused to the electrode catalyst layers efficiently. Thus, the power generation performance is degraded significantly.

In an attempt to address the problem, Japanese Laid-Open Patent Publication No. 7-192743 discloses a fuel cell system 1 as shown in FIG. 7. The fuel cell system 1 includes a solid oxide fuel cell 2. The fuel cell 2 is connected to a fuel system 3 for supplying a hydrogen gas to the fuel cell 2, an air system 4 for supplying the air as an oxygen-containing gas to the fuel cell 2, and a coolant water circulation system 5 for supplying the coolant water to the fuel cell 2 by circulation.

According to the disclosure, the fuel system 3 supplies the hydrogen gas in a hydrogen absorption storage alloy tank 6 to the fuel cell 2 through a hydrogen supply pipe 7. The excessive hydrogen gas discharged from the fuel cell 2 is supplied to a gas liquid separator 8, and the water mixed in the hydrogen gas is stored as condensed water. The hydrogen gas in the gas liquid separator 8 is circulated to the hydrogen supply pipe 7 by a pump 9. Thus, the water in the excessive hydrogen gas discharged from the fuel cell 2 is stored as condensed water in the gas liquid separator 8. After water is removed, the hydrogen gas is supplied again as the fuel gas to the fuel cell 2.

However, in Japanese Laid-Open Patent Publication No. 7-192743, it is likely that the excessive hydrogen gas is mixed into a large amount of water produced in the power generation, and then, flows into the gas liquid separator 8. Therefore, a considerably large amount of hydrogen gas is mixed into the condensed water in the gas liquid separator 8. The consumption amount of hydrogen gas is large, and the desired fuel economy cannot be achieved.

In the case where a large amount of hydrogen gas is mixed into the condensed water stored in the gas liquid separator 8, at the time of diluting the condensed water, and discharging the diluted water to the outside, it is necessary to increase the amount of the dilution gas supplied by the air system 5. Thus, the energy consumption of devices such as a pump or a supercharger for supplying the oxygen-containing gas is increased, and the desired fuel economy cannot be achieved.

As described above, in the structure of supplying the fuel gas to the fuel cell by circulation, the water (produced in the power generation) discharged from the fuel cell is supplied again to the fuel cell. Therefore, flooding may occur at the anode. Further, when nitrogen in the air supplied to the cathode passes through the solid polymer electrolyte membrane, the nitrogen may be mixed into the fuel gas, and the nitrogen concentration may be increased undesirably.

Therefore, a process of purging the fuel gas containing water and nitrogen from the fuel gas circulation passage is performed. In this regard, for example, a hydrogen purging control apparatus is disclosed in Japanese Laid-Open Patent Publication No. 2004-55287. As shown in FIG. 8, a fuel cell system including the hydrogen purging control apparatus has a fuel cell 1a. The air pressurized at a predetermined pressure by a compressor 2a is supplied to the cathode (not shown) through an air supply channel 3a. Further, a hydrogen gas is supplied from a hydrogen tank 4a to the anode (not shown) of the fuel cell 1a through a hydrogen gas supply channel 5a.

The hydrogen gas which has not been consumed in the reaction in the fuel cell 1a is discharged to a hydrogen gas circulation channel 6a together with the water produced in the power generation, and flows into the hydrogen gas supply channel 5a by operation of an ejector 7a. A purging hydrogen diluter 9a is connected to the hydrogen gas circulation channel 6a through a purging valve 8a. The air discharged from the fuel cell 1a flows into the purging hydrogen diluter 9a through an air discharge channel 3b together with the water produced.

Therefore, at the time of purging, the purging valve 8a is opened such that the hydrogen gas discharged from the fuel cell 1a flows into the purging hydrogen diluter 9a together with the water produced in the power generation. Since the air discharged from the fuel cell 1a and the water produced in the power generation are supplied into the purging hydrogen diluter 9a, the hydrogen gas is mixed with the discharged air, and diluted. After the hydrogen concentration is adjusted to a predetermined concentration, the hydrogen gas is discharged to the outside.

In Japanese Laid-Open Patent Publication No. 2004-55287, the air supplied to the fuel cell 1a is discharged to the air discharge channel 3b together with the water produced in the reaction at the cathode. Therefore, by the change in the amount of the produced water, the air pressure in the fuel cell 1a changes easily. Thus, it is difficult to control the flow rate of the air supplied to the fuel cell 1a.

SUMMARY OF THE INVENTION

A general object of the present invention is to provide a fuel cell system in which the water produced in the power generation is discharged from a fuel cell stack efficiently, and improvement in the fuel economy is achieved suitably.

Further, a main object of the present invention is to provide a fuel cell system in which the water produced in the power generation is discharged from a fuel cell stack efficiently, the flow rate of the oxygen-containing gas is controlled easily, and improvement in the fuel economy is achieved suitably.

According to an aspect of the present invention, a fuel cell system comprises a fuel cell stack formed by stacking an electrolyte electrode assembly and separators in a stacking direction. The electrolyte electrode assembly includes a pair of electrodes and an electrolyte interposed between the electrodes. At least reactant gas supply passages and reactant gas discharge passages extend through the fuel cell stack in the stacking direction. Further, the fuel cell system comprises a gas liquid separation mechanism connected to a fuel gas discharge passage as one of the reactant gas discharge passages through an exhaust gas channel exposed to the outside of the fuel cell stack, a first drain channel having one end connected to the fuel gas discharge passage separately from the exhaust gas channel, and having the other end connected to the gas liquid separation mechanism for chiefly discharging liquid droplets from the fuel gas discharge passage to the gas liquid separation mechanism, and a second drain channel connected to the gas liquid separation mechanism for chiefly discharging liquid droplets from the gas liquid separation mechanism.

Preferably, the fuel cell system further comprises a dilution mechanism connected to the second drain channel for chiefly discharging liquid droplets from the gas liquid separation mechanism to the dilution mechanism and a dilution fluid supply section for supplying a dilution fluid to the dilution mechanism. In the structure, it is possible to effectively dilute the fuel gas in the liquid droplets discharged from the second drain channel.

According to another aspect of the present invention, a fuel cell system comprises a fuel cell stack formed by stacking an electrolyte electrode assembly and separators in a stacking direction. The electrolyte electrode assembly includes a pair of electrodes and an electrolyte interposed between the electrodes. At least reactant gas supply passages and reactant gas discharge passages extend through the fuel cell stack in the stacking direction. Further, the fuel cell system comprises a gas liquid separation mechanism connected to a fuel gas discharge passage as one of the reactant gas discharges passages through an exhaust gas channel exposed to the outside of the fuel cell stack, a dilution mechanism, a dilution fluid supply section for supplying a dilution fluid to the dilution mechanism, a first drain channel having one end connected to the fuel gas discharge passage separately from the exhaust gas channel, and having the other end connected to the dilution mechanism for chiefly discharging liquid droplets from the fuel gas discharge passage to the dilution mechanism, and a second drain channel connected to the gas liquid separation mechanism and the dilution mechanism for chiefly discharging liquid droplets from the gas liquid separation mechanism to the dilution mechanism.

Further, preferably, a flow rate control mechanism is disposed in each of the first and second drain channels. By operating the flow rate control mechanisms, the first and second drain channels are opened/closed, and the control of discharging the water is carried out reliably. Thus, when the water produced in the power generation has not stored to reach a predetermined amount, the fuel gas does not flow unnecessarily, and thus, the economical structure is achieved.

Further, according to still another aspect of the present invention, a fuel cell system comprises a fuel cell stack formed by stacking an electrolyte electrode assembly and separators in a stacking direction. The electrolyte electrode assembly includes a pair of electrodes and an electrolyte interposed between the electrodes. At least reactant gas supply passages and reactant gas discharge passages extend through the fuel cell stack in the stacking direction. The fuel cell system further comprises a fuel gas circulation channel connected to a fuel gas discharge passage as one of the reactant gas discharge passages through an exhaust gas channel exposed to the outside of the fuel cell stack, and connected to a fuel gas supply passage as one of the reactant gas supply passages for circulating a fuel gas, a first drain channel connected to the fuel gas discharge passage separately from the exhaust gas circulation channel, and exposed to the outside of the fuel cell stack for chiefly discharging liquid droplets from the fuel gas discharge passage, and a flow rate control mechanism disposed in the first drain channel.

Further, preferably, the fuel gas circulation channel has a gas liquid separation mechanism, and a second drain channel is connected to the gas liquid separation mechanism through a flow rate control mechanism. In the structure, it is possible to discharge the produced water from the gas liquid separation mechanism through the second drain channel reliably.

Preferably, the fuel cell system further comprises a dilution mechanism connected to the gas liquid separation mechanism through the second drain channel, and a dilution fluid supply section for supplying a dilution fluid to the dilution mechanism. In the structure, it is possible to effectively dilute the fuel gas in the water discharged from the second drain channel.

Further, according to still another aspect of the present invention, a fuel cell system comprises a fuel cell stack formed by stacking an electrolyte electrode assembly and separators in a stacking direction. The electrolyte electrode assembly includes a pair of electrodes and an electrolyte interposed between the electrodes. At least reactant gas supply passages and reactant gas discharge passages extend through the fuel cell stack in the stacking direction. Further, the fuel cell system comprises a dilution mechanism connected to a fuel gas discharge passage as one of the reactant gas discharge passages, an exhaust gas channel having one end connected to an oxygen-containing gas discharge passage as the other reactant gas discharge passage, and having the other end connected to the dilution mechanism, and a drain channel having one end connected to the oxygen-containing gas discharge passage separately from the exhaust gas channel and exposed to the outside of the fuel cell stack, and having the other end connected to the dilution mechanism for chiefly discharging liquid droplets from the oxygen-containing gas discharge passage to the dilution mechanism, and a discharge channel connected to the dilution mechanism for discharging gas component and liquid droplets from the dilution mechanism.

Further, preferably, a flow rate control mechanism is disposed in at least the drain channel. In the structure, the drain channel is opened/closed, and the control of discharging the water is carried out reliably.

In the present invention, the water produced in the power generation (water droplets) is discharged to the drain channel for chiefly discharging water. The water is supplied to the gas liquid separation mechanism. Thus, the amount of water in the fuel gas discharge passage is reduced effectively. The exhaust gas (excessive fuel gas) discharged from the fuel gas discharge passage to the exhaust gas channel is not mixed into the water produced in the power generation significantly. Thus, the amount of the fuel gas discharged wastefully without consumption is reduced desirably. Accordingly, the amount of consumption of the fuel gas is reduced, and improvement in the fuel economy is achieved.

Further, in the present invention, the produced water in the fuel gas discharge passage is discharged through the first drain channel for chiefly discharging the water. The water is supplied to the dilution mechanism. Therefore, the exhaust gas discharged from the fuel gas discharge passage to the fuel gas channel is not mixed into the produced water significantly, and the amount of the fuel gas discharged wastefully without consumption is reduced desirably.

Further, since the amount of the fuel gas mixed into the liquid droplets discharged into the dilution mechanism is small, the fuel gas concentration is low. Thus, it is possible to reduce the flow rate of the dilution fluid such as the air supplied to the dilution mechanism. Accordingly, it is possible to reduce the energy consumption of devices such as a fan or a supercharger for supplying the dilution fluid. Thus, improvement in the fuel economy is achieved easily.

Further, in the present invention, the produced water in the fuel gas discharge passage is discharged from the first drain channel suitably. In the structure of the present invention, the gas liquid separation mechanism and the dilution mechanism may not be required. Therefore, the number of components of the fuel cell system is reduced significantly. The overall structure of the fuel cell system is simplified desirably, and thus, the fuel cell system is economical advantageously.

Further, in the present invention, the water produced in the power generation (liquid droplets) is discharged to drain channel for chiefly discharging water. The water is supplied to the dilution mechanism. Thus, the amount of water in the fuel gas discharge passage is reduced effectively. It is possible to inhibit the water produced in the power generation from being mixed into the exhaust gas discharged from the oxygen-containing gas discharge passage to the exhaust gas channel. Thus, it is possible to suitably prevent variation of the pressure of the oxygen-containing gas supplied to the fuel cell stack, and control the flow rate of the oxygen-containing gas easily and reliably.

Further, since the amount of the produced water discharged to the dilution gas channel is reduced, the energy consumption of devices such as a fan or a supercharger for supplying the oxygen-containing gas from the fuel cell stack to the dilution mechanism is reduced, and improvement in the fuel economy is achieved easily.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
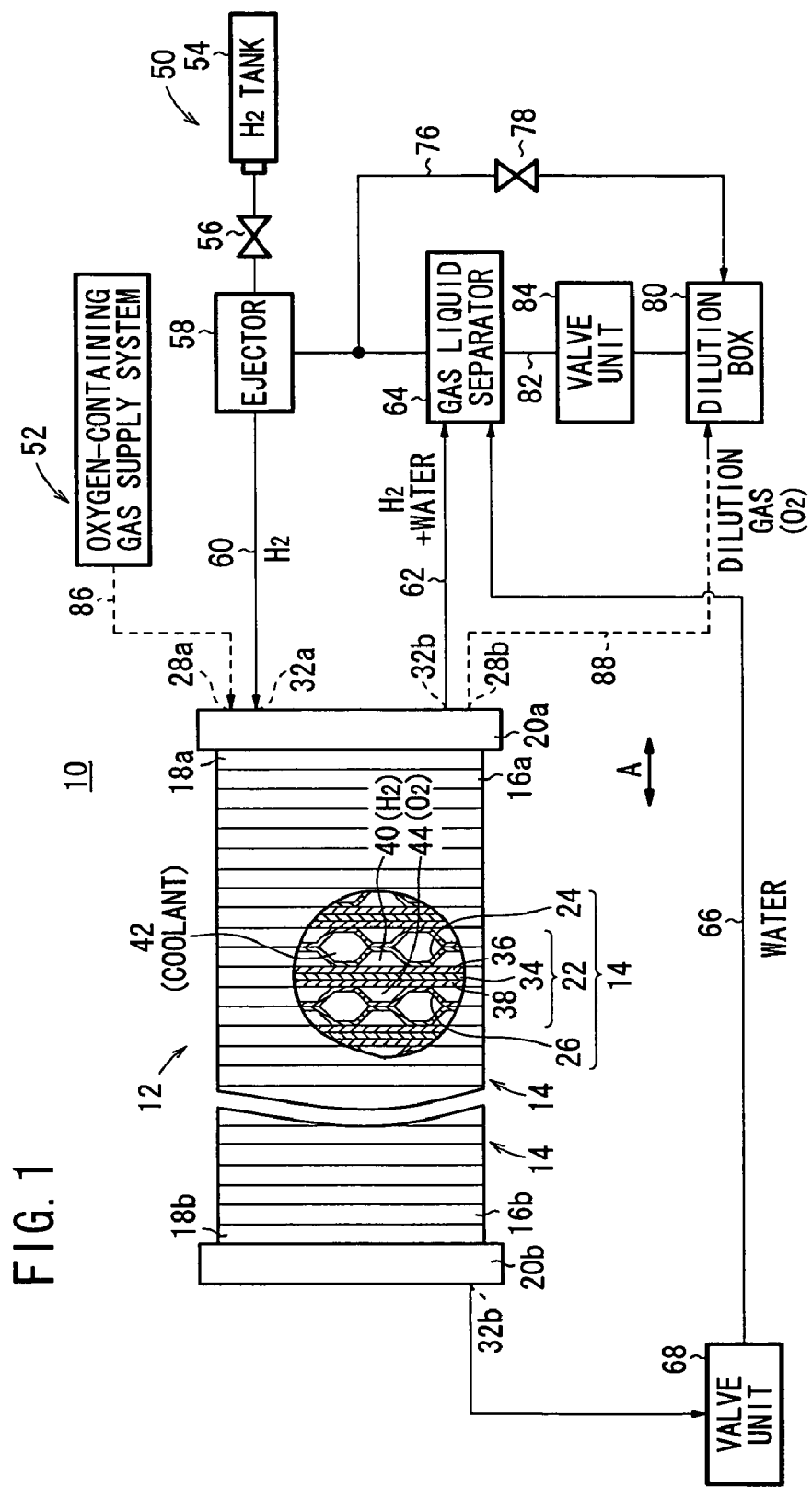
FIG. 1 is a view schematically showing a fuel cell system according to a first embodiment of the present invention.

FIG. 1 is a view schematically showing a fuel cell system 10 according to a first embodiment of the present invention.

The fuel cell system 10 includes a fuel cell stack 12. The fuel cell stack 12 is formed by stacking a plurality of unit cells 14 in a horizontal direction indicated by an arrow A. At one end of the unit cells 14 in the stacking direction, a terminal plates 16a is provided. An insulating plate 18a is provided outside the terminal plate 16a. Further, a first end plate 20a is provided outside the insulating plate 18a. At the other end of the unit cells 14 in the stacking direction, a terminal plate 16b is provided. An insulating plate 18b is provided outside the terminal plate 16b. Further, a second end plate 20b is provided outside the insulating plate 18b.

Figure 2:
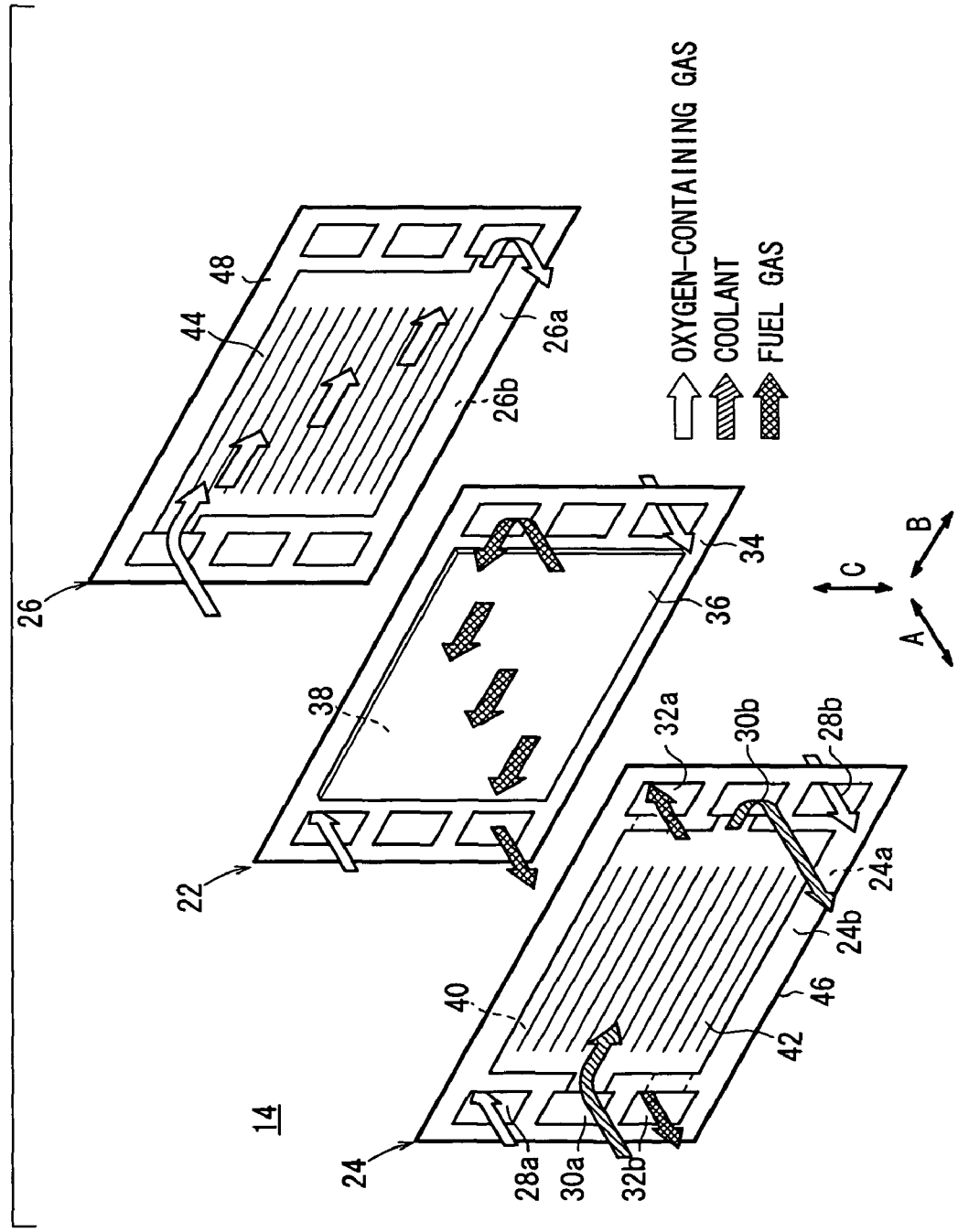
FIG. 2 is an exploded perspective view showing a unit cell of the fuel cell system.

As shown in FIGS. 1 and 2, each of the unit cells 14 includes a membrane electrode assembly (electrolyte electrode assembly) 22 and first and second metal separators 24, 26 sandwiching the membrane electrode assembly 22. The first and second metal separators 24, 26 are thin corrugated metal plates. Instead of using the first and second metal separators 24, 26, for example, carbon separators may be used.

At one end of the unit cell 14 in a longitudinal direction indicated by an arrow B in FIG. 2, an oxygen-containing gas supply passage 28a for supplying an oxygen-containing gas, a coolant supply passage 30a for supplying a coolant, and a fuel gas discharge passage 32b for discharging a fuel gas such as a hydrogen-containing gas are provided. The oxygen-containing gas supply passage 28a, the coolant supply passage 30a, and the fuel gas discharge passage 32b extend through the unit cell 14 in the direction indicated by the arrow A.

At the other end of the unit cell 14 in the longitudinal direction, a fuel gas supply passage 32a for supplying the fuel gas, a coolant discharge passage 30b for discharging the coolant, and an oxygen-containing gas discharge passage 28b for discharging the oxygen-containing gas are provided. The fuel gas supply passage 32a, the coolant discharge passage 30b, and the oxygen-containing gas discharge passage 28b extend through the unit cell 14 in the direction indicated by the arrow A.

The membrane electrode assembly 22 includes an anode 36, a cathode 38, and a solid polymer electrolyte membrane 34 interposed between the anode 36 and the cathode 38. The solid polymer electrolyte membrane 34 is formed by impregnating a thin membrane of perfluorosulfonic acid with water, for example.

Each of the anode 36 and the cathode 38 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 36 and the electrode catalyst layer of the cathode 38 are fixed to both surfaces of the solid polymer electrolyte membrane 34, respectively.

The first metal separator 24 has a fuel gas flow field 40 on its surface 24a facing the membrane electrode assembly 22. The fuel gas flow field 40 is connected to the fuel gas supply passage 32a at one end, and connected to the fuel gas discharge passage 32b at the other end. Further, the first metal separator 24 has a coolant flow field 42 on the other surface 24b. The coolant flow field 42 is connected to the coolant supply passage 30a at one end, and connected to the coolant discharge passage 30b at the other end.

The second metal separator 26 has an oxygen-containing gas flow field 44 on its surface 26a facing the membrane electrode assembly 22. The oxygen-containing gas flow field 44 is connected to the oxygen-containing gas supply passage 28a at one end, and connected to the oxygen-containing gas discharge passage 28b at the other end. The other surface 26b of the second metal separator 26 is stacked on the surface 24b of the adjacent first metal separator 24. When the first metal separator 24 and the second metal separator 26 are stacked together, the coolant flow field 42 is formed between the surface 24b of the first metal separator 24 and the surface 26b of the second metal separator 26.

A first seal member 46 is formed integrally on the surfaces 24a, 24b of the first metal separator 24 around the outer marginal end of the first metal separator 24. A second seal member 48 is formed integrally on the surfaces 26a, 26b of the second metal separator 26 around the outer marginal end of the second metal separator 26.

As shown in FIG. 1, the fuel cell stack 12 utilizes a fuel gas supply system 50, an oxygen-containing gas supply system 52, and a coolant supply system (not shown). The fuel gas supply system 50 includes a hydrogen tank 54. The hydrogen tank 54 is connected to a fuel gas circulation channel 60 through a valve 56 and an ejector 58. The fuel gas circulation channel 60 is connected to the fuel gas supply passage 32a at the first end plate 20a. A gas liquid separator (gas liquid separation mechanism) 64 is connected to the fuel gas discharge passage 32b at the first end plate 20a through a fuel gas discharge channel (exhaust gas channel) 62. The gas liquid separator 64 is connected to the ejector 58.

A first drain channel 66 is connected to the fuel gas discharge passage 32b at the second end plate 20b, independently from the fuel gas discharge channel 62. The first drain channel 66 is connected to the gas liquid separator 64. That is, the first drain channel 66 is provided on the side of the fuel cell stack 12 opposite to the fuel gas discharge channel 62. Thus, even if the fuel cell stack 12 is tilted, the water is discharged from the fuel cell stack 12 efficiently.

Preferably, the first drain channel 66 connected to the fuel gas discharge passage 32b is provided at a lower position in comparison with the fuel gas discharge channel 62. Further, preferably, the diameter of the first drain channel 66 is smaller than the diameter of the fuel gas discharge channel 62. Thus, the amount of the fuel gas entered into the first drain channel 66 is minimized. In the first drain channel 66, a valve unit 68 is provided near the fuel gas discharge passage 32b.

Figure 3:
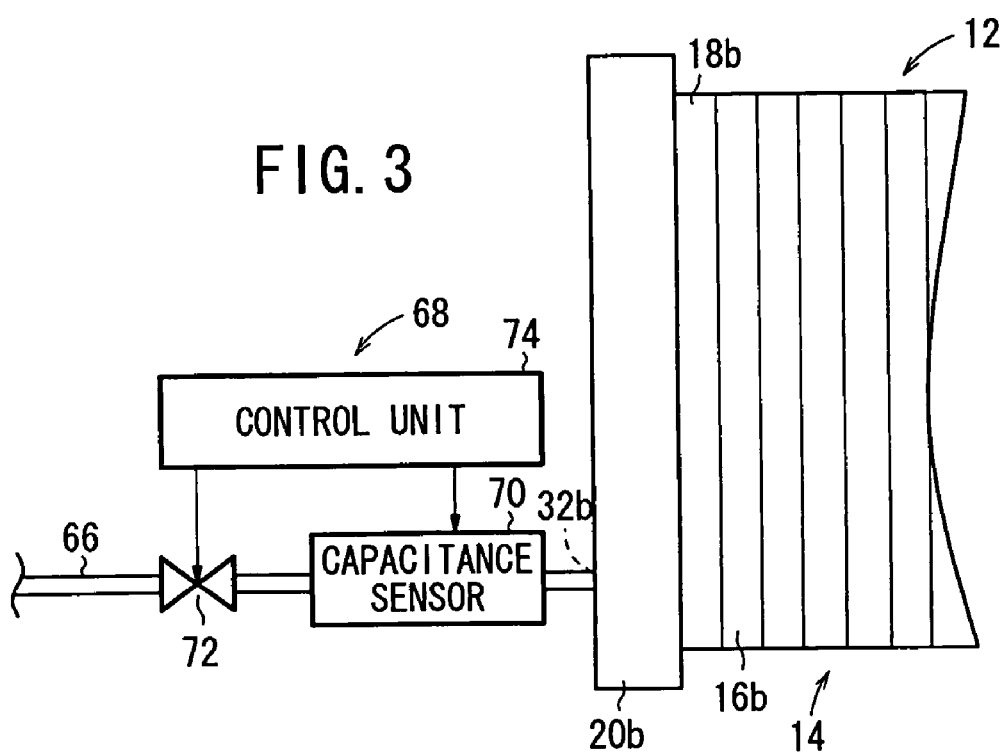
FIG. 3 is a view showing a valve unit of the fuel cell system.

As shown in FIG. 3, the valve unit 68 is provided in the first drain channel 66. The valve unit 68 has a sensor such as a capacitance sensor 70 for detecting that a predetermined amount of liquid droplets is stored in the first drain channel 66, a valve 72 provided near the capacitance sensor 70 for opening/closing the first drain channel 66, and a control unit 74 for controlling the valve 72 based on a signal from the capacitance sensor 70. It is not essential to use the capacitance sensor 70. Various sensors capable of detecting the presence of water droplets in the pipe such as an ultrasonic sensor can be used.

As shown in FIG. 1, a purge channel 76 is branched from a position between the gas liquid separator 64 and the ejector 58. The purge channel 76 is connected to a dilution box (dilution mechanism) 80 through a valve 78. A second drain channel 82 is connected to the gas liquid separator 64 as necessary for chiefly discharging water from the gas liquid separator 64. The second drain channel 82 is connected to the dilution box 80 through a valve unit 84. The structure of the valve unit 84 is the same as the structure of the valve unit 68.

The oxygen-containing gas supply system 52 includes an oxygen-containing gas supply channel 86 connected to the oxygen-containing gas supply passage 28a at the first end plate 20a. A pressurized air is supplied to the oxygen-containing gas supply channel 86 through, e.g., a compressor (not shown). A dilution gas channel (dilution fluid supply section) 88 as an exhaust gas channel is connected to the oxygen-containing gas discharge passage 28b at the first end plate 20a, and connected to the dilution box 80.

Operation of the fuel cell system 10 will be described below.

Firstly, as shown in FIG. 1, an oxygen-containing gas such as an air is supplied to the oxygen-containing gas supply passage 28a at the first end plate 20a of the fuel cell stack 12 through the oxygen-containing gas supply system 52. Further, a fuel gas such as a hydrogen containing gas is supplied from the hydrogen tank 54 of the fuel gas supply system 50 to the fuel gas circulation channel 60 through the valve 56. The fuel gas is supplied into the fuel gas supply passage 32a at the first end plate 20a.

Further, a coolant such as pure water, an ethylene glycol or an oil is supplied into the coolant supply passage 30a at the first end plate 20a through the coolant supply system (not shown) by circulation.

As shown in FIG. 2, in the fuel cell stack 12, an oxygen-containing gas is supplied from the oxygen-containing gas supply passage 28a to the oxygen-containing gas flow field 44 of the second metal separator 26, and flows along the cathode 38 of the membrane electrode assembly 22 for inducing an electrochemical reaction at the cathode 38. The fuel gas is supplied from the fuel gas supply passage 32a to the fuel gas flow field 40 of the first metal separator 24, and flows along the anode 36 of the membrane electrode assembly 22 for inducing an electrochemical reaction at the anode 36.

Thus, in each of the membrane electrode assemblies 22, the oxygen-containing gas supplied to the cathode 38, and the fuel gas supplied to the anode 36 are consumed in the electrochemical reactions at catalyst layers of the cathode 38 and the anode 36 for generating electricity.

The coolant is supplied to the coolant flow field 42 between the first and second metal separators 24, 26, and flows in the direction indicated by the arrow B. The coolant is used for cooling the membrane electrode assembly 22, and flows through the coolant discharge passage 30b. The coolant is discharged into a circulation channel (not shown) connected to the first end plate 20a, and used by circulation.

Further, after the oxygen-containing gas is consumed at the cathode 38, the oxygen-containing gas flows through the oxygen-containing gas discharge passage 28b, and is discharged into the dilution gas channel 88 connected the first end plate 20a (see FIG. 1). Likewise, after the fuel gas is consumed at the anode 36, the fuel gas flows through the fuel gas discharge passage 32b, and discharged into the fuel gas discharge channel 62 connected to the first end plate 20a.

In the first embodiment, the first drain channel 66 is connected to the end of the fuel gas discharge passage 32b on the side of the second end plate 20b. The height of the first drain channel 66 is lower than the height of the fuel gas discharge channel 62. Thus, the water produced in the power generation (hereinafter also simply referred to as the "produced water") is discharged from the fuel gas discharge passage 32b to the first drain channel 66 smoothly, and supplied to the gas liquid separator 64 by operation of the valve unit 68.

In the valve unit 68, as shown in FIG. 3, the first drain channel 66 is closed by the valve 72 in advance. The capacitance sensor 70 detects the amount of water discharged into the first drain channel 66. When the detected amount of water reaches a predetermined amount, the control unit 74 opens the valve 72. Thus, by the pressure of the compressed hydrogen gas supplied into the fuel cell stack 12, the water produced in the power generation flows from the first drain channel 66 into the gas liquid separator 64 reliably.

Since the amount of produced water is reduced, the excessive fuel gas discharged from the fuel gas discharge passage 32b to the fuel gas discharge channel 62 is not mixed into the water significantly. Therefore, the amount of the fuel gas mixed into the produced water, and retained in the gas liquid separator 64 is reduced suitably. The excessive fuel gas is efficiently supplied from the gas liquid separator 64 to the fuel gas circulation channel 60 through the ejector 58. Thus, in the first embodiment, it is possible to achieve improvement in the fuel economy.

Further, in the first embodiment, the gas liquid separator 64 is connected to the dilution box 80 through the second drain channel 82, and the valve unit 84 is disposed in the second drain channel 82. Therefore, the produced water can be discharged reliably from the gas liquid separator 64 to the dilution box 80. The consumed air flows into the dilution box 80 through the dilution gas channel 88. Therefore, even if the fuel gas is mixed into the produced water discharged from the gas liquid separator 64, it is possible to dilute the mixed fuel gas by the consumed air suitably.

The amount of the fuel gas mixed into the water discharged from the gas liquid separator 64 into the dilution box 80 is small. Therefore, the flow rate of the dilution gas (air) supplied to the dilution box 80 is reduced. Thus, the energy consumption of devices such as a compressor or a fan for supplying the air discharged from the oxygen-containing gas discharge passage 28b to the dilution box 80 as the dilution gas is reduced. Accordingly, improvement in the fuel economy is achieved easily.

Figure 4:
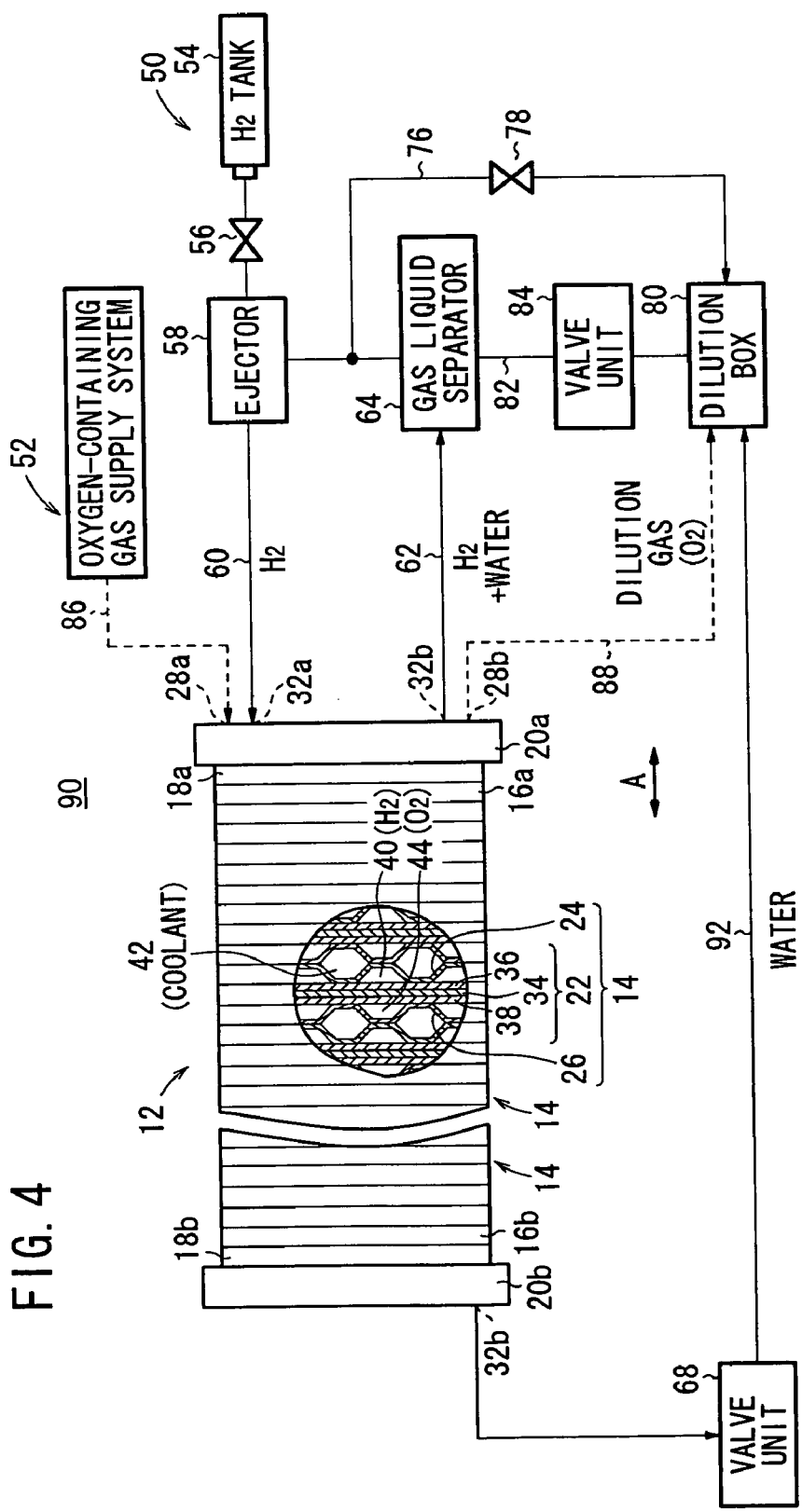
FIG. 4 is a view schematically showing a fuel cell system according to a second embodiment of the present invention.

FIG. 4 is a view schematically showing a fuel cell system 90 according to a second embodiment of the present invention. The constituent elements that are identical to those of the fuel cell system 10 according to the first embodiment are labeled with the same reference numerals, and description thereof will be omitted. Likewise, in third and fourth embodiments as described later, the constituent elements that are identical to those of the fuel cell system 10 according to the first embodiment are labeled with the same reference numerals, and description thereof will be omitted.

The fuel cell system 90 includes a first drain channel 92 which is connected to the fuel gas discharge passage 32b of the second end plate 20b and the dilution box 80. The valve unit 68 is provided near the fuel gas discharge passage 32b. The structure of the first drain channel 92 is the same as the structure of the first drain channel 66.

In the second embodiment, the water produced in the power generation in the fuel gas discharge passage 32b is discharged through the first drain channel 92 to the dilution box 80. Therefore, the amount of water discharged from the fuel gas discharge passage 32b to the gas liquid separator 64 through the fuel gas discharge channel 62 is reduced. The amount of fuel gas mixed into the water, and retained in the gas liquid separator 64 is reduced suitably. Accordingly, the same advantages as in the case of the first embodiment can be obtained. For example, the amount of consumption of the fuel gas is reduced, and improvement in the fuel economy is achieved.

Figure 5:
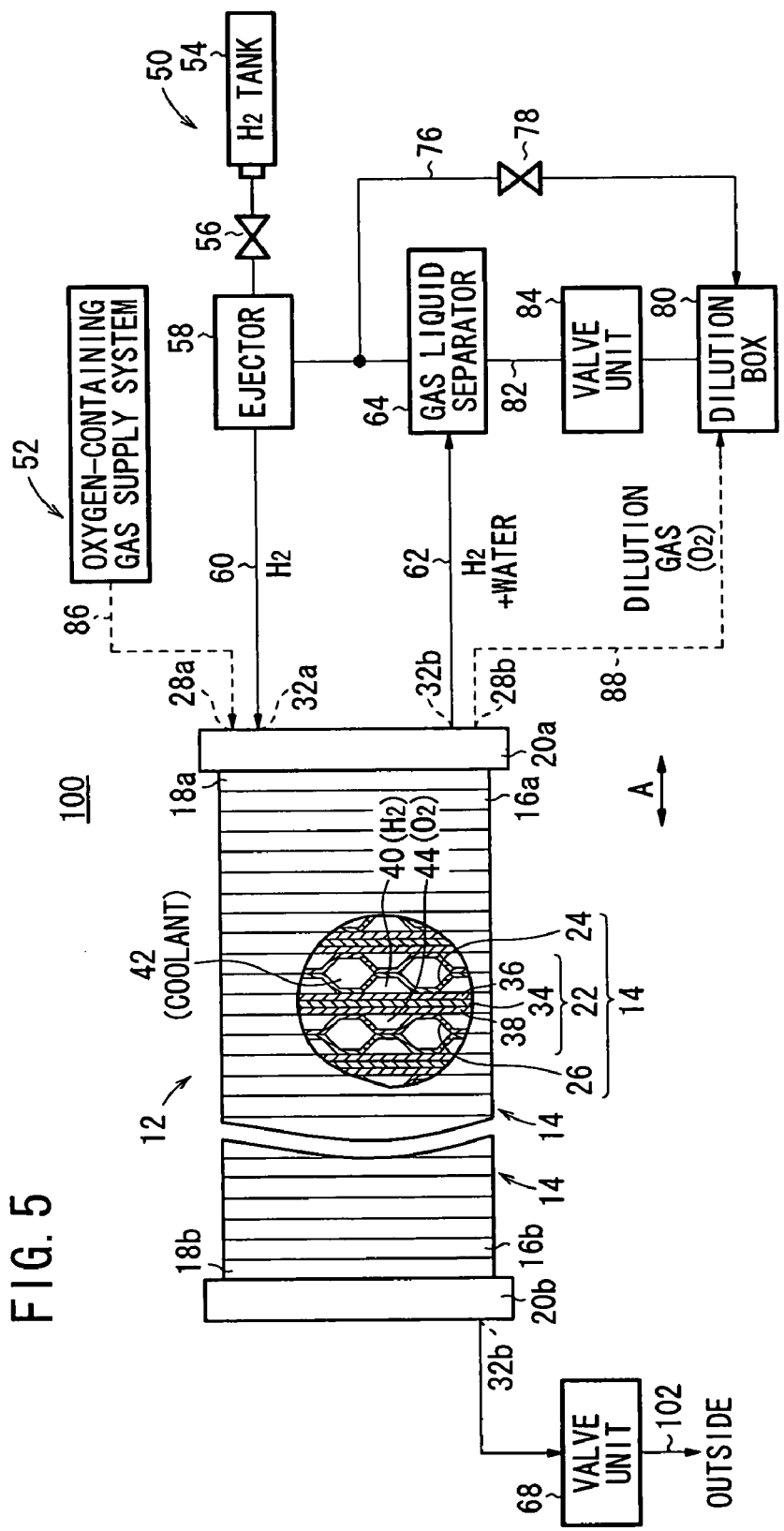
FIG. 5 is a view schematically showing a fuel cell system according to a third embodiment of the present invention.

FIG. 5 is a view schematically showing a fuel cell system 100 according to a third embodiment of the present invention.

The fuel cell system 100 includes a first drain channel 102 connected to the fuel gas discharge passage 32b extending through the second end plate 20b. The first drain channel 102 can be opened to the outside. The valve unit 68 is disposed in the first drain channel 102. The gas liquid separator 64 and/or the dilution box 80 can be used as necessary, and may not be required.

In the fuel cell system 100, the water produced in the power generation is discharged to the outside from the fuel gas discharge passage 32b through the first drain channel 102. Thus, it is possible to suitably reduce the amount of water in the excessive fuel gas discharged into the fuel gas discharge channel 62. Accordingly, the same advantages as in the case of the first and second embodiments can be obtained.

Further, since the water produced in the power generation is discharged to the outside from the first drain channel 102, the gas liquid separator 64 and the dilution box 80 may not be required. Therefore, the number of components of the fuel cell system 100 is reduced significantly. The overall structure of the fuel cell system 100 is simplified desirably, and thus, the fuel cell system 100 is economical advantageously.

Figure 6:
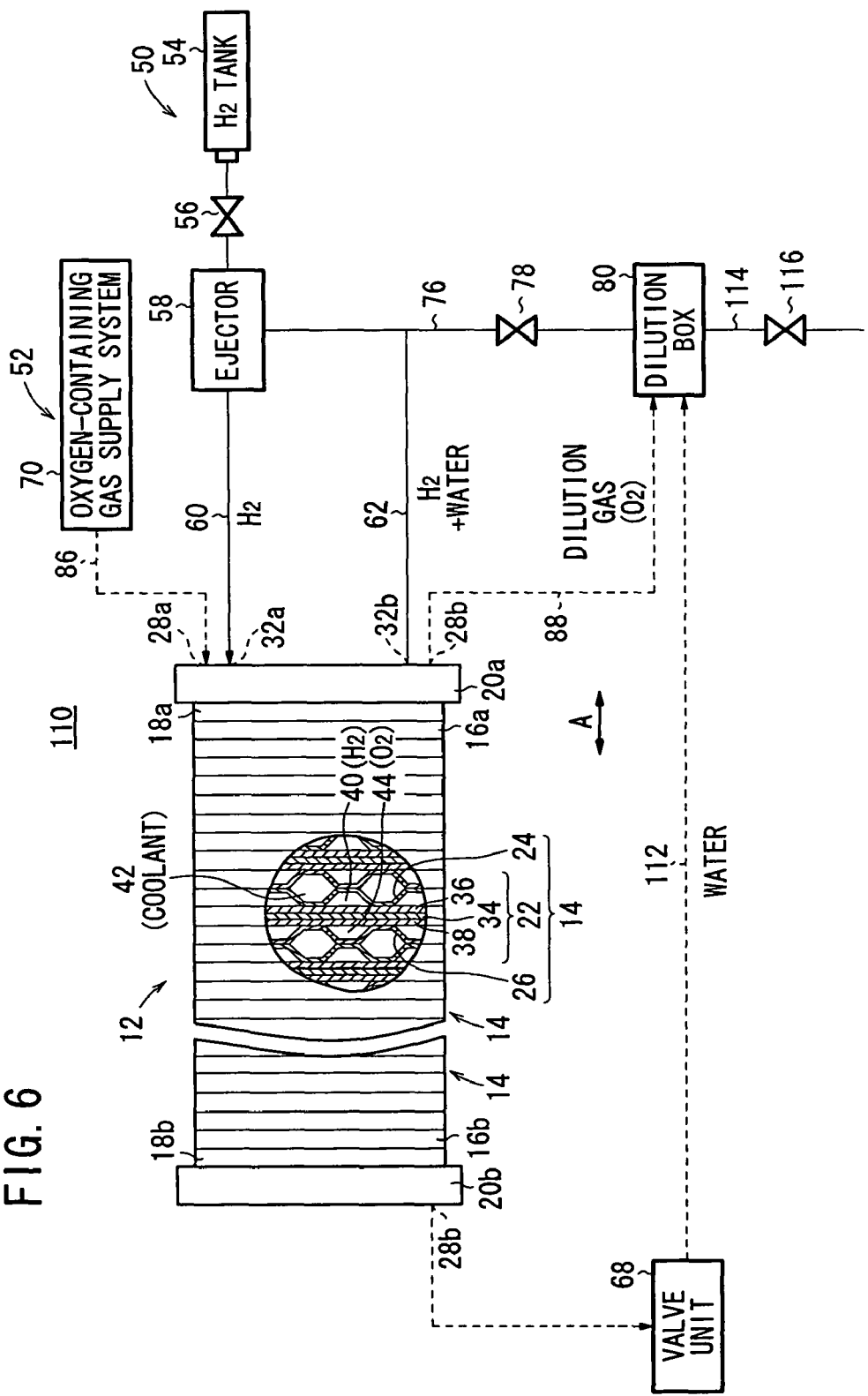
FIG. 6 is a view schematically showing a fuel cell system according to a fourth embodiment of the present invention.
Figure 7:
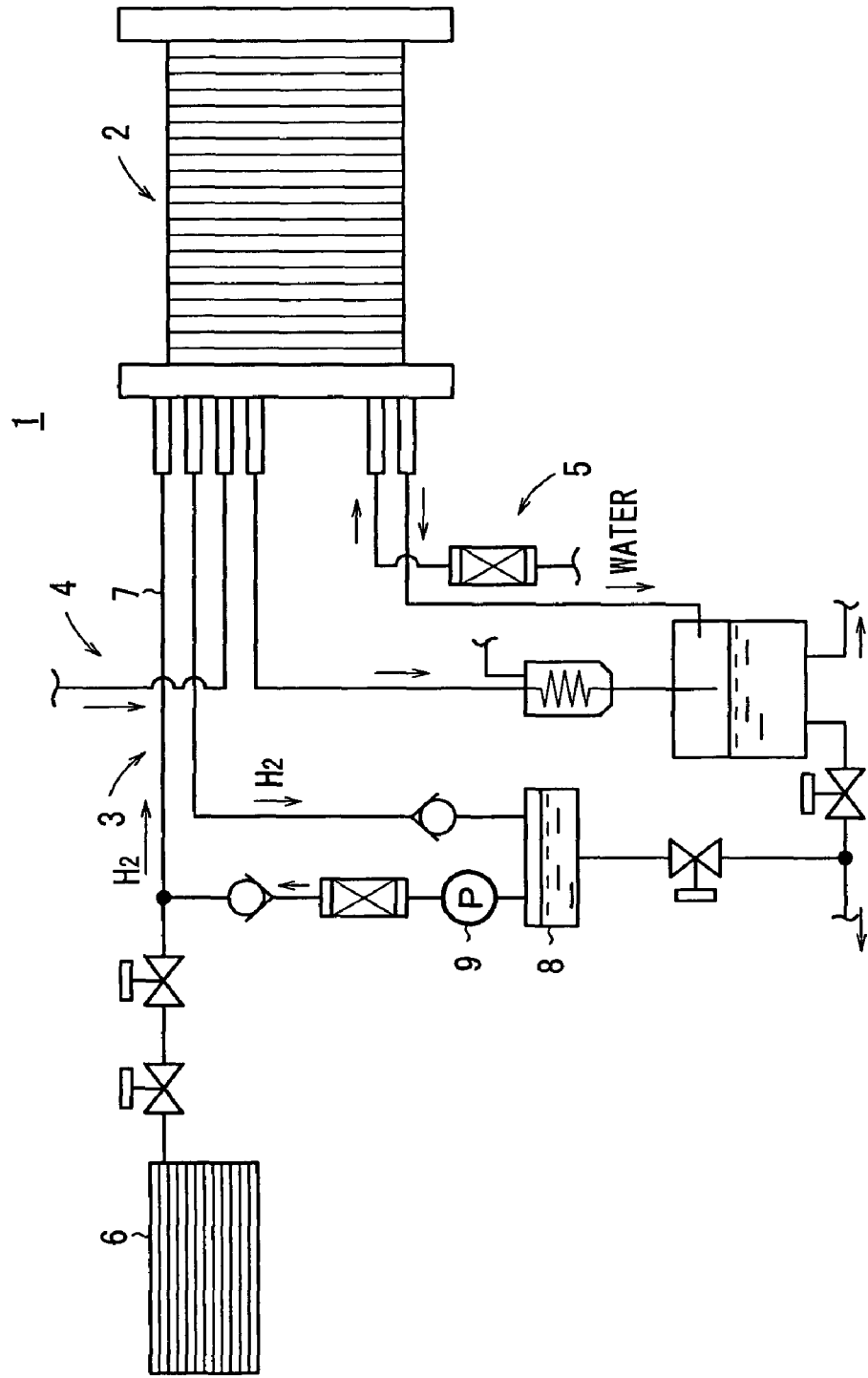
FIG. 7 is a view showing a fuel cell system disclosed in Japanese Laid-Open Patent Publication No. 7-192743.
Figure 8:
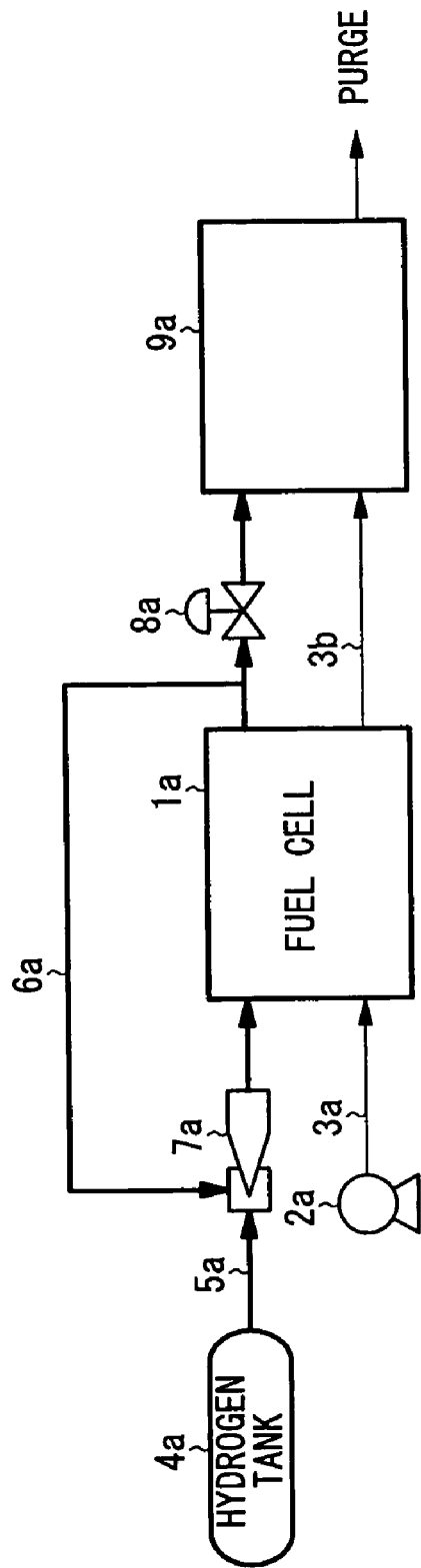
FIG. 8 is a view showing a fuel cell system disclosed in Japanese Laid-Open Patent Publication No. 2004-55287.

FIG. 6 is a view schematically showing a fuel cell system 110 according to a fourth embodiment of the present invention.

The fuel cell system 110 has a drain channel 112 connected to the oxygen-containing gas discharge passage 28b at the second end plate 20b. The drain channel 112 is connected to the dilution box 80 independently from the dilution gas channel 88. Preferably, the drain channel 112 connected to the oxygen-containing gas discharge passage 28b is provided at a lower position in comparison with the dilution gas channel 88, and the diameter of the drain channel 112 is smaller than the diameter of the dilution gas channel 88. The valve unit 68 is disposed in the drain channel 112 near the oxygen-containing gas discharge passage 28b.

A discharge channel 114 is connected to the dilution box 80. The water produced in the power generation and the gas component (chiefly including the diluted fuel gas component) in the dilution box 80 are discharged through the discharge channel 114 to the outside. A valve 116 is disposed in the discharge channel 114 for opening/closing the discharge channel 114.

In the fourth embodiment, the drain channel 112 is connected to the end of the oxygen-containing gas discharge passage 28b on the side of the second end plate 20b. The height of the drain channel 112 is lower than the height of the dilution gas channel 88. The water produced in the power generation is smoothly discharged from the oxygen-containing gas discharge passage 28b to the drain channel 112, and supplied to the dilution box 80 by operation of the valve unit 68.

Therefore, the amount of water in the oxygen-containing gas discharge passage 28b is reduced effectively. It is possible to inhibit the water produced in the power generation from being mixed into the dilution gas (consumed oxygen-containing gas) discharged from the oxygen-containing gas discharge passage 28b to the dilution gas channel 88.

Thus, it is possible to suitably prevent variation of the pressure of the oxygen-containing gas supplied to the fuel cell stack 12, and control the flow rate of the oxygen-containing gas easily and reliably. Further, since the amount of the produced water discharged to the dilution gas channel 88 is reduced, the energy consumption of devices such as a compressor for supplying the oxygen-containing gas from the fuel cell stack 12 to the dilution box 80 is reduced, and improvement in the fuel economy is achieved easily.

At the time of purging the fuel gas, the valve 78 disposed in the purge channel 76 is opened, and the purge gas containing water, a nitrogen gas, and the fuel gas flows into the dilution box 80 from the fuel gas discharge channel 62. The dilution gas is constantly supplied to the dilution box 80 through the dilution gas channel 88. When the hydrogen concentration of the gas component is reduced to a predetermined value or less, the valve 116 is opened, and the gas component and the produced water are discharged to the outside from the discharge channel 114.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell system comprising:
    A fuel cell stack formed by stacking an electrolyte electrode assembly and separators in a stacking direction, wherein said electrolyte electrode assembly and said separators are arranged in an upright position, said electrolyte electrode assembly including a pair of electrodes and an electrolyte interposed between said electrodes, at least reactant supply passages and reactant gas discharge passages extending through said fuel cell stack in the stacking direction, said fuel cell stack including a first end plate at a first end of the fuel cell stack in the stacking direction and a second end plate at a second end of the fuel cell stack in the stacking direction;
    a fuel gas circulation channel connected to a fuel gas discharge passage as one of said reactant gas discharge passages at said first end plate through an exhaust gas channel exposed to the outside of said fuel cell stack, and connected to a fuel gas supply passage as one of said reactant gas supply passages at said first end plate for circulating a fuel gas;
    a first drain channel connected to said fuel gas discharge passage at said second end plate, and exposed to the outside of said fuel cell stack for chiefly discharging liquid droplets from said fuel gas discharge passage, wherein the first drain channel is provided at a side of the fuel cell stack opposite the exhaust gas channel in the stacking direction and the first drain channel is connected to one end of the fuel gas discharge passage at a position that lies on a plane between a position where the exhaust gas channel is connected to the fuel gas discharge passage and a bottom of the fuel cell stack; and
    a flow rate control mechanism disposed in said first drain channel,
    wherein the fuel gas circulation channel includes a gas liquid separation mechanism connected to the fuel gas discharge passage at the first end plate through the exhaust gas channel; and
    wherein a second drain channel is connected to the gas liquid separation mechanism through a flow rate control mechanism.

2. A fuel cell system according to claim 1, wherein said flow rate control mechanism comprises:
    a sensor for detecting a predetermined amount of liquid droplets are stored in said first drain channel;
    a valve disposed near said sensor for opening/closing said first drain channel; and
    a control unit for controlling said valve based on a signal from said sensor.

3. A fuel cell system according to claim 1, further comprising:
    a dilution mechanism connected to said gas liquid separation mechanism through said second drain channel; and
    a dilution fluid supply section for supplying a dilution fluid to said dilution mechanism.

4. A fuel cell system according to claim 1, wherein said first drain channel connected to said fuel gas discharge passage is positioned below said fuel gas circulation channel, and the diameter of said first drain channel is smaller than the diameter of said fuel gas circulation channel.

* * * * *